(12) United States Patent
Fleischer et al.

(10) Patent No.: US 10,385,732 B2
(45) Date of Patent: Aug. 20, 2019

(54) POWER PLANT

(71) Applicant: Siemens Aktiengesellschaft, Munich (DE)

(72) Inventors: Maximilian Fleischer, Hoehenkirchen (DE); Michael Weinhold, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 71 days.

(21) Appl. No.: 15/527,469

(22) PCT Filed: Nov. 19, 2015

(86) PCT No.: PCT/EP2015/077126
§ 371 (c)(1),
(2) Date: May 17, 2017

(87) PCT Pub. No.: WO2016/087222
PCT Pub. Date: Jun. 9, 2016

(65) Prior Publication Data
US 2017/0328239 A1 Nov. 16, 2017

(30) Foreign Application Priority Data
Dec. 5, 2014 (DE) .................. 10 2014 225 063

(51) Int. Cl.
*B01D 53/14* (2006.01)
*B01D 53/22* (2006.01)
(Continued)

(52) U.S. Cl.
CPC .......... *F01K 13/00* (2013.01); *B01D 53/1475* (2013.01); *B01D 53/22* (2013.01);
(Continued)

(58) Field of Classification Search
CPC ............ B01D 53/1425; B01D 53/1475; B01D 2257/504; B01D 2257/80; B01D 2258/0283; F01K 13/00; F01K 23/10
See application file for complete search history.

(56) References Cited

U.S. PATENT DOCUMENTS

| | | | | |
|---|---|---|---|---|
| 2003/0065042 A1* | 4/2003 | Shaw | ........................ | C01B 3/36 518/702 |
| 2006/0108214 A1* | 5/2006 | Amendola | ........... | B01D 53/326 204/252 |

(Continued)

FOREIGN PATENT DOCUMENTS

| | | | | |
|---|---|---|---|---|
| CN | 101440019 A | 5/2009 | ........... | C07C 29/151 |
| CN | 201799208 U | 4/2011 | ............. | B01D 53/14 |

(Continued)

OTHER PUBLICATIONS

Naterer, G.F. et al., "Synergistic roles of off-peak electrolysis and thermochemical production of hydrogen from nuclear energy is Canada", International Journal of Hydrogen Energy, 32, 2008, pp. 6849-6857. (Year: 2008).*

(Continued)

*Primary Examiner* — Jason M Greene
(74) *Attorney, Agent, or Firm* — Slayden Grubert Beard PLLC

(57) ABSTRACT

The present disclosure relates to power plants. The teachings thereof may be embodied in power plants which extract and store carbon dioxide from flue gas generated in the power plant, and in methods for operating a power plant of this kind. For example, a method for operating a power plant may include: generating electrical energy from a combustion process, extracting carbon dioxide from a flue gas generated during the combustion process; storing the extracted carbon dioxide; acquiring current electricity price data; comparing the current electricity price data with an electricity price (Continued)

threshold; and if the electricity price falls below the electricity price threshold, operating an electrolysis device to convert stored carbon dioxide into other substances.

8 Claims, 1 Drawing Sheet

(51) Int. Cl.
  *B01D 53/96* (2006.01)
  *F01K 13/00* (2006.01)
  *F01K 23/10* (2006.01)
  *H02J 3/38* (2006.01)
  *H02J 3/00* (2006.01)

(52) U.S. Cl.
  CPC .............. *F01K 23/10* (2013.01); *H02J 3/382* (2013.01); *B01D 53/1425* (2013.01); *B01D 53/965* (2013.01); *B01D 2256/22* (2013.01); *B01D 2257/504* (2013.01); *H02J 3/008* (2013.01); *Y02C 10/06* (2013.01); *Y02E 20/16* (2013.01); *Y02E 20/326* (2013.01); *Y02P 80/21* (2015.11); *Y04S 50/10* (2013.01)

(56) References Cited

U.S. PATENT DOCUMENTS

| | | | |
|---|---|---|---|
| 2009/0130734 A1* | 5/2009 | Mets | C12M 21/04 |
| | | | 435/167 |
| 2013/0214542 A1 | 8/2013 | Knop et al. | 290/1 R |
| 2014/0151240 A1* | 6/2014 | Bedell | B01D 53/1425 |
| | | | 205/455 |
| 2015/0045458 A1 | 2/2015 | Zhang et al. | 518/704 |
| 2015/0240716 A1* | 8/2015 | Dietrich | C25B 1/04 |
| | | | 60/780 |
| 2016/0040084 A1 | 2/2016 | Zhang et al. | 422/162 |
| 2016/0153316 A1* | 6/2016 | Bergins | F01K 13/00 |
| | | | 60/645 |

FOREIGN PATENT DOCUMENTS

| | | | |
|---|---|---|---|
| CN | 102240497 A | 11/2011 | ............ B01D 53/18 |
| CN | 102660340 A | 9/2012 | ............ C01B 32/50 |
| CN | 202538625 U | 11/2012 | ............ B01D 53/62 |
| CN | 103298976 A | 9/2013 | ............... C07C 1/12 |
| EP | 2737937 A1 | 6/2014 | ............ B01D 53/62 |
| WO | 2016/087222 A1 | 6/1916 | ............ B01D 53/14 |
| WO | 2014/127913 A2 | 8/2014 | ............ B01D 53/00 |

OTHER PUBLICATIONS

Beck, J. et al., "Electrochemical Conversion of Carbon Dioxide to Hydrocarbon Fuels, EME 580 Spring 2010", retrieved from http://www.ems.psu.edu/~elsworth/courses/egee580/2010/Final_Reports/co2_electrochem.pdf on Jan. 25, 2016. (Year: 2010).*

Chinese Office Action, Application No. 201580065635.2, 8 pages, dated May 2, 2018.

Naterer, G.F. et al., "Synergistic Roles of Off-Peak Electrolysis and Thermochemical Production of Hydrogen from Nuclear Energy in Canada," International Journal of Hydrogen Energy, vol. 33, No. 23, 9 pages, Oct. 28, 2008.

Beck, J. et al., "Electrochemical Conversion of Carbon Dioxide to Hydrocarbon Fuels," EME 580 Spring 2010 Contents, URL: http://www.ems.psu.edu/~elsworth/courses/egee580/2010/Final%20Reports/co2_electrochem.pdf, 42 pages, Apr. 1, 2010.

Agarwal, Arun S. et al., "The Electrochemical Reduction of Carbon Dioxide to Formate/Formic Acid: Engineering and Economic Feasibility," CHEMSUSCHEM, vol. 4, No. 9, pp. 1301-1310, Sep. 19, 2011.

International Search Report and Written Opinion, Application No. PCT/EP2015/077126, 15 pages, dated Feb. 4, 2016.

* cited by examiner

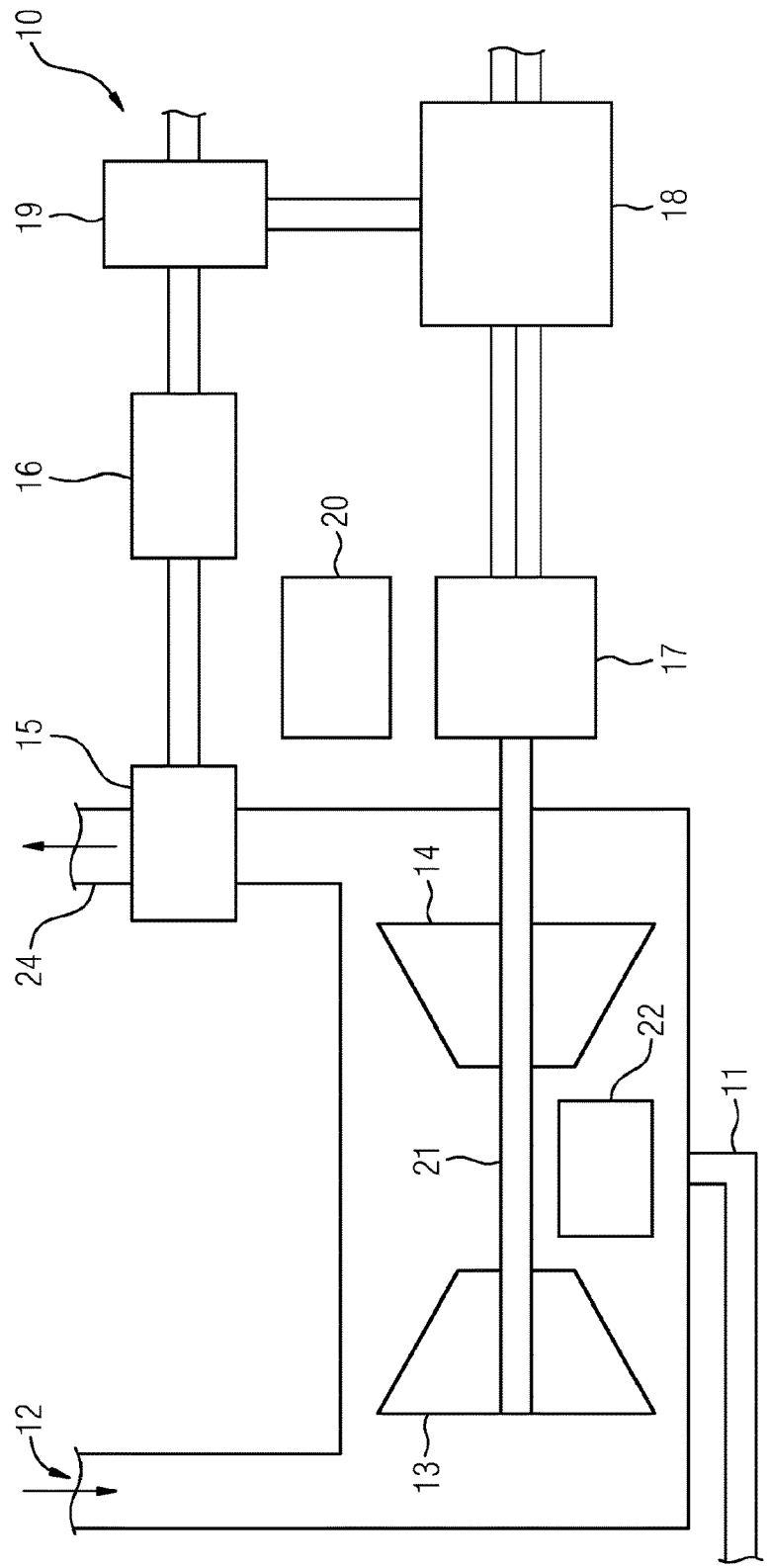

POWER PLANT

CROSS-REFERENCE TO RELATED APPLICATIONS

This application is a U.S. National Stage Application of International Application No. PCT/EP2015/077126 filed Nov. 19, 2015, which designates the United States of America, and claims priority to DE Application No. 10 2014 225 063.3 filed Dec. 5, 2014, the contents of which are hereby incorporated by reference in their entirety.

TECHNICAL FIELD

The present disclosure relates to power plants for generating electrical energy from fossil fuel, biomass, or biogas. The teachings thereof may be embodied in power plants which extract and store carbon dioxide from flue gas generated in the power plant, and in methods for operating a power plant of this kind.

BACKGROUND

Conventional power plants burn fossil fuels such as coal to generate electrical energy, i.e., electricity. The focus when constructing these power plants is on maximum efficiency in operation, thereby minimizing the amount of waste gas—containing, among other components, the greenhouse gas carbon dioxide-generated for a given output. In operation, nevertheless, large amounts of carbon dioxide are formed, and a search is on for methods to avoid this.

In the case of one such method, called Carbon Capture and Sequestration (CCS), the carbon dioxide is captured and may be pumped into underground reservoirs for eventual, environmentally compatible storage. The energy requirement to achieve this, however, is not insignificant by comparison with the energy yield of the power plant in question.

The fossil-fired power plants, which in many countries, along with atomic power plants, ensure a stable basic supply of energy are contrasted by the power plants which operate with renewable energy sources. These plants do not produce waste gases, but in the case of wind energy and solar energy are unstable and also unpredictable in their energy yield.

SUMMARY

The teachings of the present disclosure may be embodied in power plants for generating electrical energy from fossil fuel, biomass, or biogas, and/or methods for operating a power plant of this kind, with which improved treatment of the carbon dioxide emissions is made possible.

For example, some embodiments may include a power plant (10) for generating electrical energy, comprising: means for generating (12, 14, 22, 17) electrical energy from fossil fuel, biomass or biogas, means for extracting (15, 16) and storing carbon dioxide from flue gas generated in the power plant (10), characterized by an electrolysis device (19) for converting the stored carbon dioxide into other substances, a control device (20) for controlling the electrolysis device (19), designed such that the control device acquires current electricity price data and, if the electricity price falls below an electricity price threshold, puts the electrolysis device (19) into operation and, if the electricity price exceeds the electricity price threshold, shuts down the electrolysis device (19).

In some embodiments, the electrolysis device (19) is designed for converting the stored carbon dioxide using electrical energy supplied from outside the power plant (10).

In some embodiments, the electrolysis device (19) is designed to be operated using electrical energy from renewable energy sources that is supplied exclusively from outside the power plant (10).

In some embodiments, the control device (20) is designed for controlling the power plant (10) in two operating modes, wherein in a first operating mode, the means for generating (12, 14, 22, 17) electrical energy and the means for extracting (15, 16) are operated and the electrolysis device (19) is idle, and in a second operating mode, the means for generating (12, 14, 22, 17) electrical energy and the means for extracting (15, 16) are idle and the electrolysis device (19) is operated.

In some embodiments, during operation of the electrolysis device (19) the electricity needed therefor is taken from the electricity generated by the power plant (10).

In some embodiments, the electrolysis device (19) comprises a carbon dioxide electrolysis device (19).

In some embodiments, there are means for storing oxygen from the electrolysis of carbon dioxide.

In some embodiments, the means for extracting (15, 16) and storing carbon dioxide comprise an amine scrubbing device.

In some embodiments, there are means for extracting water from the flue gas generated.

Some embodiments may include a method for operating a power plant (10) as claimed in any of the preceding claims for generating (12, 14, 22, 17) electrical energy, wherein electrical energy is generated from fossil fuel, biomass or biogas, and carbon dioxide is extracted from flue gas generated in the power plant, and is stored, a control device (20) acquires current electricity price data and compares said data with an electricity price threshold, and if the electricity price falls below the electricity price threshold, an electrolysis device (19) which converts the stored carbon dioxide into other substances is operated, if the electricity price exceeds the electricity price threshold, the electrolysis device (19) is idle.

BRIEF DESCRIPTION OF THE DRAWINGS

The teachings of the present disclosure are elucidated in more detail below, using working examples, with reference to the single FIGURE.

The FIGURE shows, in a highly schematized manner, one working example of a gas-fired power plant 10 according to the teachings of the present disclosure.

DETAILED DESCRIPTION

The teachings of the present disclosure may be embodied in power plants for generating electrical energy comprising means for generating electrical energy from fossil fuel, biomass, or biogas, as for example corresponding burner units, and means for extracting and storing carbon dioxide from flue gas generated in the power plant, as for example an amine scrubber. The power plant may further comprise an electrolysis device for converting the stored carbon dioxide into other substances. Furthermore, the power plant may comprise a control device for controlling the electrolysis device, designed in such a way that the control device acquires current electricity price data and, if the electricity price falls below an electricity price threshold, puts the electrolysis device into operation and, if the electricity price exceeds the electricity price threshold, shuts down the electrolysis device.

In some methods for operating a power plant for generating electrical energy according to the teachings of the present disclosure, the power plant is operated in two mutually exclusive operating modes. In the first operating mode, electrical energy is generated from fossil fuel, biomass, and/or biogas, and carbon dioxide is extracted from flue gas generated in the power plant, and is stored. In the second operating mode, hydrocarbons are generated from the stored carbon dioxide, for which electrical energy supplied from outside the power plant is used.

In some embodiments, electrical energy is generated from fossil fuel, biomass, and/or biogas, and carbon dioxide is extracted from flue gas generated in the power plant, and is stored. Furthermore, a control device acquires current electricity price data and compares said data with an electricity price threshold. If the electricity price falls below the electricity price threshold, an electrolysis device is operated and the stored carbon dioxide is converted thereby into other substances. If, in contrast, the electricity price exceeds the electricity price threshold, the electrolysis device is shut down and not operated.

The generation of useful substances such as, for example, hydrocarbons or other useful products such as CO or alcohols, for example, from the carbon dioxide produced in the power plant ideally takes place not in ongoing operation, during which the energy needed for processing the low-energy carbon dioxide is detrimental to the energy balance of the power plant. Instead this generation takes place at times in which the electrical energy generated by the power plant cannot be sold or can be sold only with limitations on profitability. Such times increasingly exist as a result of highly fluctuating electricity prices with occasional oversupply.

The means for generating electrical energy from fossil fuel, biomass, and/or biogas may comprise the associations of combustion devices that are typical of power plants—e.g., appropriately fed burners together with surrounding devices such as turbines, in which the heat generated in the combustion is converted into a rotational movement. Furthermore, the means for generating electrical energy from fossil fuel, biomass, and/or biogas may comprise one or more generators which generate electrical voltage from the rotational movement.

In some embodiments, the energy for the operation of the electrolysis device is drawn from outside the power plant and may originate from renewable energy sources. In such embodiments, the energy may be drawn exclusively from renewable energy sources. The amount of energy from renewable sources has no relation to the actual electrical energy requirement, leading to the situation—which already exists and will be exacerbated in the future on further expansion of renewable energy—whereby the generated energy from renewable sources—and of course any otherwise-generated energy at this point in time—has to be given away at zero cost or even at a negative price. In accordance with the teachings herein, however, the use of an excess of renewable energies in the power plant is made possible at exactly the point that these energies are available.

In some embodiments, the usual operation of the power plant can be set aside—in other words, no electricity can be generated there, and the excess electricity from outside the power plant can be used in order to convert the carbon dioxide into more valuable substances such as methane or methanol, for example. In this case, then, the power plant is controlled in two operating modes. In the first operating mode, the means for generating electrical energy and the means for extracting are operated and the electrolysis device is idle. In the second operating mode, the means for generating electrical energy and the means for extracting are idle and the electrolysis device is operated. In some embodiments, the operating modes are mutually exclusive.

The power plant may be a gas-fired power plant. In such embodiments, the switchover between the operating modes can be relatively quick. The plant may be a combined gas-fired power plant, as for example a gas-fired steam power plant or a combined gas-and-steam power plant.

In some embodiments, the operating modes are not mutually exclusive, and instead the activity of the power plant for generating electrical energy is continued even in times of low electricity price. This is rational, for example, if the power plant is a coal-fired power plant, since these power plants cannot be switched over between operation and standstill within a short time. Where the power plant continues to operate continually, the electricity used for the electrolysis may also be taken from the generative output of the power plant itself.

The electrolysis device may be a device for water electrolysis or a device for carbon dioxide electrolysis. The latter may operate at low pressures and low temperatures and therefore represents a comparatively energy-efficient and low-complexity solution. In some embodiments, storing the carbon dioxide and releasing it again completed using a device for amine scrubbing.

In some embodiments, oxygen formed in the electrolysis can be stored. The stored oxygen may likewise be used as a raw material of intrinsic value.

In some embodiments, water as well as the carbon dioxide is extracted from the flue gas. This water may be used, for example, as an additional reactant for the conversion of the carbon dioxide. To do so reduces the amount of fresh water which has to be supplied from externally.

In some embodiments, the means for reacting may take a form in which they generate the fuel required for the power plant. In that case, this fuel as well may be stored after generation and used when combustion is operated, in other words in the first operating mode. In this case, the power plant acts as a large battery for excess energy, more particularly from renewable sources.

In some embodiments, the gas-fired power plant 10 comprises a supply line 11 for natural gas, which passes the natural gas to a combustion chamber 22. Not shown, but known, furthermore, are a storage area for liquid fuel, heating oil for example, and a corresponding supply line to the combustion chamber 22.

In some embodiments, the combustion chamber 22 is disposed between a compressor 13, which is provided with an air supply 12, and a turbine 14, both connected on a common shaft 21 to a generator 17. The outlet of the turbine 14 is connected to a waste-gas removal line 24. The generator 17 is driven via the shaft 21 and is connected on the output side to a transformer 18, which ensures electrical energy generated is taken off to the general electricity network.

The waste-gas removal line 24 may include a carbon dioxide capture device 15, which is connected to a carbon dioxide store 16 and passes captured CO2 to said store 16. The carbon dioxide capture device 15 and the carbon dioxide store 16 may comprise an amine scrubbing device, for example. In addition to known steps of purification of the flue gas, the carbon dioxide capture device 15 may house a device for additional purification steps. That device may be configured for removal of nitrogen oxides, sulfur oxides, and/or phosphorus oxides.

Connected in turn to the carbon dioxide store 16 is an electrolysis unit 19, configured in some embodiments as a carbon dioxide electrolyzer. For electrical supply, the electrolysis unit 19 is likewise connected to the transformer 18. In some embodiments, the electrolysis unit 19 may be connected to a standalone power supply intended specifically for that purpose, which is used to supply electricity from outside the gas-fired power plant 10 and which is not shown in the FIGURE.

In some embodiments, the electrolysis unit 19 generates, for example, carbon monoxide and oxygen or methanol (CH3OH) from the carbon dioxide taken from the carbon dioxide store 16. Further starting materials, for example for the chemical industry, that can be generated by the electrolysis unit 19 are HCOOH (formic acid), C2H2 (ethyne), or C2H4 (ethene). It is also possible to generate chemical energy sources, as for example methane (CH4) or ethane (C2H6). The electrolysis unit 19 may comprise a device for separating the electrolysis products. Accordingly, the fractions of unwanted electrolysis product are separated from the actually desired product, thereby raising the purity and hence the value and the technical usefulness of the product.

In some embodiments, a control device 20 controls the individual units of the gas-fired power plant 10. The control device 20 is designed for collecting information on the current price of generated electricity and comparing it at regular intervals, each minute or half-hour, for example, with a price threshold which can be specified.

If the electricity price is above the price threshold, the gas-fired power plant 10 is operated, in a first operating mode, as a power plant, and supplies electricity conventionally. In this case, therefore, fossil fuel, biogas, and/or biomass is burnt, and electricity is generated from it in the generator 17 and is fed into the network. The carbon dioxide produced in the course of combustion is stored by means of the carbon dioxide capture device 15 in the carbon dioxide store 16. In this first operating mode, the electrolysis unit 19 is not in operation.

If the electricity price falls below the price threshold, the control device 20 switches over the gas-fired power plant 10 into a second operating mode. In this operating mode, the gas-fired power plant 10 is no longer operated as such—in other words, compressor 13 and turbine 14 are run down and the gas-fired power plant 10 no longer produces electricity. In this second operating mode 20, the electrolysis unit 19 is operated.

The electrolysis unit 19 takes the stored carbon dioxide from the carbon dioxide store 16 and converts it into a substance of higher energy content such as natural gas or formic acid, for example. The electrical energy required for this purpose is in this case drawn from outside the gas-fired power plant 10. It may come, for example, from renewable sources such as wind turbines or the like. Since this operating mode is used at low electricity prices, there is customarily an oversupply of electricity from renewable sources, a situation which may even lead to negative electricity prices, and makes operation in the second operating mode highly advantageous. The electrical energy may also originate from electricity stores sited outside the gas-fired power plant 10.

Electrolysis of the carbon dioxide in the electrolysis unit 19 may be accompanied by a formation of oxygen. It is possible for this oxygen to be stored in an oxygen store, which is not shown in the FIGURE. The oxygen is therefore generated in the second operating mode. If the gas-fired power plant 10 switches back over into the first operating mode, in which operation of the electrolysis unit 19 is halted and the gas-fired power plant 10 operates again as such, the stored oxygen may be used for optimizing the combustion of the fossil fuel.

In some embodiments, the fossil fuel used for energy generation is generated by the electrolysis unit 19 and stored in the gas-fired power plant 10. If, for example, the gas-fired power plant 10 uses natural gas as an energy source for the combustion, then in this embodiment the electrolysis unit 19 produces methane as soon as the gas-fired power plant 10 is operating in the second operating mode. The methane is introduced into a natural gas store which is part of the power plant itself but is not shown in the FIGURE. If the gas-fired power plant 10 is again operating in the first operating mode, the stored methane is used as fuel in place or in addition to the externally acquired natural gas, as long as the stocks are sufficient.

In some embodiments, in addition to its power plant function, the gas-fired power plant 10 represents a battery—that is, a store for electrical current. If there is an oversupply of electrical current, caused typically by a high supply from renewable sources, the gas-fired power plant 10 converts this typically cheap electricity, using the carbon dioxide already stored, into the energy source which is utilized for combustion in the gas-fired power plant 10. Later, when the oversupply of electricity has subsided and the electricity price has therefore risen again, this energy source is converted back into electricity.

In some embodiments, there is a coal-fired power plant equipped correspondingly. The coal-fired power plant, accordingly, comprises not only the known elements for generating energy but also a carbon dioxide capture device 15 which is connected to a carbon dioxide store 16 and passes captured CO2 into said store 16. For example, the carbon dioxide capture device 15 and the carbon dioxide store 16 may be designed as an amine scrubbing device. In addition to known steps of the purification of the flue gas, a device for additional purification steps may be arranged in the carbon dioxide capture device 15. The former device may be designed for removal of nitrogen oxides, sulfur oxides and/or phosphorus oxides.

In some embodiments, connected in turn to the carbon dioxide store 16 is an electrolysis unit 19, in the form of a carbon dioxide electrolyzer. For electrical supply, the electrolysis unit 19 is likewise connected to the transformer 18. The electrolysis unit 19 generates, for example, carbon monoxide and oxygen or methanol (CH3OH) from the carbon dioxide taken from the carbon dioxide store 16. Other starting materials, for the chemical industry, for example, that may be generated by the electrolysis unit 19 are HCOOH (formic acid), C2H2 (ethyne), or C2H4 (ethene). It is also possible for chemical energy sources to be generated, as for example methane (CH4) or ethane (C2H6). The electrolysis unit 19 may comprise a device for separation of the electrolysis products. With this device, the fractions of unwanted electrolysis product are separated from the actually desired product, thereby enhancing the purity and hence the value and the technical usefulness of the product.

In some embodiments, a control device 20 controls the individual units of the coal-fired power plant. The control device 20 collects information on the current price of generated electricity and compares it at regular intervals, each minute or half-hour, for example, with a price threshold, which can be specified. If the electricity price is above the price threshold, the coal-fired power plant is operated as a power plant and supplies electricity conventionally. In this case, therefore, fossil fuel, biogas, and/or biomass is burnt, and electricity is generated therefrom in the generator 17 and is fed into the network. The carbon dioxide produced in the course of combustion is stored in the carbon dioxide store 16 by means of the carbon dioxide capture device 15. In this first operating mode, the electrolysis unit 19 is not in operation.

If the electricity price falls below the price threshold, the control device 20 switches the coal-fired power plant over into a second operating mode. In this operating mode, the coal-fired power plant continues to be operated. Coal-fired power plants are usually not suitable for short-term rundown and startup, and so unaltered operation or a slightly modified operation during a phase of low electricity price is advantageous. Now, however, the electrolysis unit 19 is operated. The electrolysis unit 19 takes the stored carbon dioxide from the carbon dioxide store 16 and converts it into a substance of higher energy content, such as natural gas or formic acid, for example. In this case, the electrical energy required for this purpose is drawn from the coal-fired power plant itself. Since this operating mode is used when electricity prices are low, the inward feeding of the electricity into the network is economically disadvantageous, to the benefit of the production of substances with value content in the electrolysis unit 19, therefore making operation in the second operating mode highly advantageous.

What is claimed is:

1. A power plant for generating electrical energy, the power plant comprising:
   a generator combusting fossil fuel, biomass, or biogas to generate electricity and supplying the electricity to a distributed power grid;
   means for extracting and storing carbon dioxide from flue gas generated by the combustion;
   an electrolysis device converting the stored carbon dioxide into other substances and generating oxygen as a byproduct of the electrolysis, the electrolysis device operating using electrical energy from the distributed power grid; and
   a control device operating the power plant in a first mode and a second mode,
   wherein, if the electricity price falls below an electricity price threshold, the control device engages the electrolysis device and shuts down the generator in the first mode and, if the electricity price exceeds the electricity price threshold, the control device engages the generator and shuts down the electrolysis device in the second mode;
   wherein the second mode includes supplying any oxygen generated during prior electrolysis to the generator to facilitate the combustion.

2. The power plant as claimed in claim 1, wherein the electrolysis device uses electrical energy from renewable energy sources that is supplied exclusively from outside the power plant.

3. A power plant for generating electrical energy, the power plant comprising:
   a generator combusting fossil fuel, biomass, or biogas to generate electricity and supplying the electricity to a distributed power grid;
   means for extracting and storing carbon dioxide from flue gas generated by the combustion;
   an electrolysis device converting the stored carbon dioxide into other substances using electrical energy from the generator including generating oxygen; and
   a control device operating the power plant in a first mode and a second mode, wherein, if the electricity price falls below an electricity price threshold, the control device engages the electrolysis device in the first mode and, if the electricity price exceeds the electricity price threshold, the control device shuts down the electrolysis device in the second mode and supplies any oxygen generated in prior operation in the first mode to facilitate combustion in the generator.

4. The power plant as claimed in claim 1, wherein the electrolysis device comprises a carbon dioxide electrolysis device.

5. The power plant as claimed in claim 4, further comprising means for storing oxygen from the electrolysis of carbon dioxide.

6. The power plant as claimed in claim 1, wherein the means for extracting and storing carbon dioxide comprise an amine scrubbing device.

7. The power plant as claimed in claim 1, further comprising means for extracting water from a flue gas generated by operation of the generator.

8. A method for operating a power plant for generating electrical energy, the method comprising:
   generating electrical energy from combustion of a fossil fuel, biomass, or biogas and providing the electrical energy to a distributed power grid;
   extracting carbon dioxide from a flue gas generated during combustion;
   storing the extracted carbon dioxide;
   acquiring current electricity price data;
   comparing the current electricity price data with an electricity price threshold;
   if the electricity price falls below the electricity price threshold, ceasing the generation of electrical energy and subsequently operating an electrolysis device to convert stored carbon dioxide into other substances and generating oxygen from the electrolysis; and
   storing the generated oxygen until the electricity price rises above the electricity price threshold and thereupon using the stored oxygen to facilitate the generating of electrical energy.

* * * * *